(12) United States Patent
Deng et al.

(10) Patent No.: US 12,193,532 B2
(45) Date of Patent: Jan. 14, 2025

(54) ANTIBACTERIAL AND ANTIVIRAL DEGRADABLE MASK AND MANUFACTURING METHOD THEREOF

(71) Applicant: NANJING FORESTRY UNIVERSITY, Suzhou (CN)

(72) Inventors: Chao Deng, Suzhou (CN); Farzad Seidi, Suzhou (CN); Qiang Yong, Suzhou (CN); Xiangyu Jin, Suzhou (CN); Chengcheng Li, Suzhou (CN); Haiying Wei, Suzhou (CN)

(73) Assignee: NANJING FORESTRY UNIVERSITY, Jiangsu (CN)

( * ) Notice: Subject to any disclaimer, the term of this patent is extended or adjusted under 35 U.S.C. 154(b) by 0 days.

(21) Appl. No.: 18/561,291

(22) PCT Filed: Jun. 1, 2021

(86) PCT No.: PCT/CN2021/097606
§ 371 (c)(1),
(2) Date: Nov. 16, 2023

(87) PCT Pub. No.: WO2022/241842
PCT Pub. Date: Nov. 24, 2022

(65) Prior Publication Data
US 2024/0237765 A1    Jul. 18, 2024

(30) Foreign Application Priority Data

May 17, 2021 (CN) .......................... 202110534082.8

(51) Int. Cl.
*D06M 13/328* (2006.01)
*A41D 13/11* (2006.01)
(Continued)

(52) U.S. Cl.
CPC .......... *A41D 13/1192* (2013.01); *B32B 5/022* (2013.01); *B32B 5/269* (2021.05);
(Continued)

(58) Field of Classification Search
CPC ......... B32B 5/022; B32B 5/269; B32B 5/271; B32B 2250/03; B32B 2571/00;
(Continued)

(56) References Cited

FOREIGN PATENT DOCUMENTS

| CN | 110983615 | 4/2020 |
|---|---|---|
| CN | 111227345 | 6/2020 |

(Continued)

OTHER PUBLICATIONS

Schoenmann et al "Sulfobetaine Methacrylate Polymers of Unconventional Polyzwitterion Architecture and Their Antifouling Properties" Biomacromolecules 2021,22,1494-1508 (Year: 2021).*
(Continued)

*Primary Examiner* — Nathan H Empie
(74) *Attorney, Agent, or Firm* — JCIPRNET (57) ABSTRACT

An antibacterial and antiviral degradable mask and a manufacturing method thereof are provided. From outside to inside, the mask sequentially comprises a surface layer (1), a core layer (2), and an inner layer (3) that contacts the face; the surface layer (1) is made of an antibacterial and antiviral cellulose spunlace non-woven fabric; the core layer (2) is made of a polypropylene melt-blown non-woven fabric; the inner layer (3) is made of a polypropylene spunbond non-woven fabric or a degradable natural cotton fabric. The mask can have both antibacterial and antiviral functions; moreover, the material is degradable, and thus, environmental pollution pressure caused by non-degradable petroleum-based fiber materials such as polypropylene can be effectively relieved.

8 Claims, 4 Drawing Sheets

(51) Int. Cl.

| | |
|---|---|
| *B32B 5/02* | (2006.01) |
| *B32B 5/26* | (2006.01) |
| *B32B 7/02* | (2019.01) |
| *D04H 1/26* | (2012.01) |
| *D04H 1/425* | (2012.01) |
| *D04H 1/4291* | (2012.01) |
| *D04H 1/4374* | (2012.01) |
| *D04H 1/4382* | (2012.01) |
| *D04H 1/492* | (2012.01) |
| *D04H 3/16* | (2006.01) |
| *D06M 13/355* | (2006.01) |
| *D06M 13/395* | (2006.01) |
| *D06M 16/00* | (2006.01) |
| *D06M 101/30* | (2006.01) |

(52) U.S. Cl.
CPC ............... *B32B 5/271* (2021.05); *B32B 7/02* (2013.01); *D04H 1/26* (2013.01); *D04H 1/425* (2013.01); *D04H 1/4291* (2013.01); *D04H 1/4374* (2013.01); *D04H 1/43835* (2020.05); *D04H 1/43838* (2020.05); *D04H 1/492* (2013.01); *D04H 3/16* (2013.01); *D06M 13/328* (2013.01); *D06M 13/355* (2013.01); *D06M 13/395* (2013.01); *D06M 16/00* (2013.01); *A41D 2500/30* (2013.01); *B01D 2239/0618* (2013.01); *B01D 2239/0627* (2013.01); *B01D 2239/0663* (2013.01); *B32B 2250/03* (2013.01); *B32B 2250/20* (2013.01); *B32B 2262/0253* (2013.01); *B32B 2262/04* (2013.01); *B32B 2262/062* (2013.01); *B32B 2262/067* (2013.01); *B32B 2262/144* (2021.05); *B32B 2262/16* (2021.05); *B32B 2307/7163* (2013.01); *B32B 2307/718* (2013.01); *B32B 2571/00* (2013.01); *D06M 2101/30* (2013.01); *D10B 2321/022* (2013.01); *D10B 2401/13* (2013.01); *D10B 2509/00* (2013.01)

(58) Field of Classification Search
CPC ............. D06M 13/328; D06M 13/355; D06M 13/395; D06M 16/00; B01D 2239/0618; D10B 2401/13; D04H 1/43835; D04H 1/43838; D04H 1/26; D04H 1/425; D04H 1/4291; D04H 1/4374; D04H 1/492; D04H 3/16
See application file for complete search history.

(56) References Cited

FOREIGN PATENT DOCUMENTS

| | | |
|---|---|---|
| CN | 111296931 | 6/2020 |
| CN | 111296970 | 6/2020 |
| CN | 111387587 | 7/2020 |
| CN | 111409341 | 7/2020 |
| CN | 111500137 | 8/2020 |
| CN | 111671182 | 9/2020 |
| CN | 212306930 | 1/2021 |
| CN | 112545077 | 3/2021 |
| CN | 112655716 | 4/2021 |
| KR | 20210036683 | 4/2021 |
| TW | 200948410 | 12/2009 |
| WO | WO-2009146412 A1 * | 12/2009 ........... D04H 3/16 |

OTHER PUBLICATIONS

Sordi et al "Synthesis of block copolymers on poly(2,3-epithiopropylmethacrylate) via RAFT polymerization and preliminary investigations on thin film" European Polymer Journal 46 (2010) 336-344 (Year: 2010).*

"International Search Report (Form PCT/ISA/210) of PCT/CN2021/097606", mailed on Jan. 25, 2022, with English translation thereof, pp. 1-6.

"Written Opinion of the International Searching Authority (Form PCT/ISA/237) of PCT/CN2021/097606", mailed on Jan. 25, 2022, pp. 1-5.

* cited by examiner

ANTIBACTERIAL AND ANTIVIRAL DEGRADABLE MASK AND MANUFACTURING METHOD THEREOF

CROSS-REFERENCE TO RELATED APPLICATION

This application is a 371 of international application of PCT application serial no. PCT/CN2021/097606, filed on Jun. 1, 2021, which claims the priority benefit of China application no. 202110534082.8, filed on May 17, 2021. The entirety of each of the above mentioned patent applications is hereby incorporated by reference herein and made a part of this specification.

BACKGROUND

Technical Field

The present disclosure relates to the field of textile technology, in particular to an antibacterial and antiviral degradable mask and a preparation method thereof.

Description of Related Art

In 2019, the coronavirus disease (COVID-19) epidemic broke out. Facing a sudden epidemic, despite the great efforts of people all over the world to fight against the catastrophic and highly infectious coronavirus, the pandemic continues and has taken the lives of millions of people. KN95 filter masks and surgical masks have become important protective equipment during the epidemic due to their ability to effectively adsorb and filter bacterial and viral aerosol particles. However, due to the lack of antibacterial and antiviral activity of masks themselves, bacteria or viruses can survive for a long time (up to 7 days) on the surface layer of the masks, resulting in a shorter lifespan of the masks with requirements for frequent replacement and extensive disposal. In addition, the main raw materials for processing masks in the current market are petroleum-based materials such as polypropylene. Due to the non-degradability of these materials, discarded masks have caused huge environmental pollution.

At present, with the continuous development of the epidemic and the increasing waste of masks, the development on functional masks that are antibacterial, antiviral, and degradable has become an urgent demand. The current research on antibacterial and antiviral masks mainly includes the following categories: 1) the utilization of sodium chloride salt to coat the mask surface layer; 2) the utilization of graphene deposition technology to modify the mask surface layer; 3) the spraying of metal nanoparticles onto the surface layer of the mask to endow the mask with antibacterial and antiviral properties; 4) the utilization of photosensitizers to chemically modify the mask surface layer to make the mask produce biocidal reactive oxygen species under light irradiation, thereby providing light induced biocidal function.

Although there are different research methods that endow masks with antibacterial and antiviral properties, these methods may pose a risk of metal ion leakage causing harm to the human body or have limited usage conditions. Moreover, the raw materials used for mask preparation have not changed, and it still cannot effectively solve the environmental pollution problem caused by disposable masks.

SUMMARY

The technical problems to be solved are as follows. The present disclosure provides an antibacterial and antiviral degradable mask and a preparation method thereof, the mask can have both antibacterial and antiviral functionalities, and the material is degradable, so that the environmental pollution pressure caused by non-degradable petroleum-based fiber materials such as polypropylene can be effectively relieved.

The technical solutions are as follows. Provided is an antibacterial and antiviral degradable mask. The antibacterial and antiviral degradable mask includes a three-layer structure, including a surface layer (1), a core layer (2), and an inner layer (3) that contacts the face from outside to inside; the surface layer (1) is made of an antibacterial and antiviral cellulose spunlace non-woven fabric; the core layer (2) is made of a polypropylene melt-blown non-woven fabric; the inner layer (3) is made of a polypropylene spunbond non-woven fabric or a degradable natural cotton fabric; the polypropylene melt-blown non-woven fabric in the core layer (2) is with a fiber fineness of 1 μm to 3 μm and a surface density of 20 $g/m^2$ to 60 $g/m^2$; the polypropylene spunbond non-woven fabric in the inner layer (3) is with a fiber fineness of 20 μm to 30 μm and a surface density of 20 $g/m^2$ to 45 $g/m^2$. A degradable natural cotton fabric is with a surface density of 20 $g/m^2$ to 45 $g/m^2$.

The cellulose spunlace non-woven fabric in the surface layer (1) is a carding spunlace non-woven fabric or a wet-laid spunlace non-woven fabric, and a surface density of the carding spunlace non-woven fabric or the wet-laid spunlace non-woven fabric is from 20 $g/m^2$ to 70 $g/m^2$.

The carding spunlace non-woven fabric in the surface layer (1) is prepared by willowing, lapping, carding, and hydroentanglement-reinforcing cellulose fibers sequentially and eventually drying in an oven.

A length of the cellulose fiber ranges from 28 mm to 58 mm.

The wet-laid spunlace non-woven fabric in the surface layer (1) is prepared by uniformly mixing 60% to 80% of wood pulp fibers and 20% to 40% of cellulose fibers with each other through beating, followed by mixing, starching, wet-laid forming, hydroentanglement reinforcing, and eventually drying in an oven.

A length of the wood pulp fiber ranges from 1 mm to 5 mm, and a length of the cellulose fiber ranges from 6 mm to 16 mm.

A preparation of the antibacterial and antiviral cellulose spunlace non-woven fabric of the surface layer (1) includes the following steps. In S1, cyclohexyl isocyanate and organic solvent are mixed with each other in a mass ratio of 1:(5-10), and a homogeneous catalyst is added to prepare a reaction solution. The homogeneous catalyst is 4-dimethylaminopyridine, triethylamine, or dibutyltin dilaurate. The vacuum-dried cellulose spunlace non-woven fabric is immersed in the reaction solution, heated for 0.5 hours to 24 hours for a covalent grafting reaction, the cellulose spunlace non-woven fabric is washed with ethanol and deionized water after the reaction is completed, and dried. In S2, the polymer and dioxane organic solvent are mixed with each other in a mass ratio of 1:7 to prepare a reaction solution. The cellulose spunlace non-woven fabric obtained in Step S1 is immersed in the reaction solution for 3 minutes to 10 minutes; the cellulose spunlace non-woven fabric obtained in Step S1 is washed with ethanol after the reaction is completed and dried; then, front and back sides of the non-woven fabric are cured under ultraviolet light and one side is irradiated for 3 minutes to 10 minutes. In S3, modified guanidine salt or neomycin sulfate is dissolved in a solvent to prepare a reaction solution with a concentration of 0.01 mg/mL to 200 mg/mL and a pH value of pH≥7; the cellulose spunlace non-woven fabric obtained in Step S2 is immersed in the reaction solution, the cellulose spunlace non-woven fabric obtained in Step S2 is reacted in an alkaline solution with a pH value of pH≥7 at a constant temperature of 60° C. to 100° C. for 4 hours to 24 hours for the covalent grafting reaction; the cellulose spunlace non-woven fabric is washed with ethanol and deionized water after the reaction is completed, and dried to obtain the antibacterial and antiviral cellulose spunlace non-woven fabric.

Preferably, in Step S1, the heating reaction process is as follows. The heating reaction is carried out at a constant temperature of 60° C. to 120° C. for 0.5 hours to 24 hours; in Step S1, the organic solvent includes one or at least two combinations of N, N-dimethylformamide, acetonitrile, dioxane, and 4-dimethylaminopyridine; in Step S1, the catalyst includes one or at least two combinations of triethylamine and dibutyltin dilaurate.

In Step S2, the structure of the polymer is where m=1-5, n=10-80; the polymer is synthesized by mixing monomers TMA and BPEMA with each other at a molar ratio of 95:5 and polymerized under an action of azobisisobutyronitrile serving as an initiator. The preparation is specifically as follows. TMA and BPEMA are dissolved in a dioxane and the solution is placed into a circular bottom flask. The solution is added with the azobisisobutyronitrile initiator, and the azobisisobutyronitrile-initiator-added solution is polymerized under a nitrogen protection at 80° C. for 8 hours. The polymer is washed out with hexane after the reaction is completed and dried. The structural formulas of the monomers TMA and BPEMA are as follows:

TMA:

BPEMA:

The reaction solvent in Step S3 includes one or at least two combinations of deionized water, ethanol, and dimethyl sulfoxide.

The polypropylene melt-blown non-woven fabric in the core layer (2) has an interception efficiency of ≥99% for NaCl particles with a size of 0.25 μm to 0.3 μm under the condition of an air flow rate of 85 L/min and a pressure drop of ≤95 Pa. The interception efficiency of NaCl particles with the size of 0.25 μm to 0.3 μm is ≥95% under the condition that the air flow rate is 32 L/min, and the pressure drop is ≤35 Pa.

The beneficial effects lie in the following. (1) The mask provided by the present disclosure includes a three-layer structure, the surface layer is made of the antibacterial and antiviral cellulose non-woven fabric with graft copolymerization of the modified guanidine salt or neomycin sulfate, and the viruses or bacteria retained on the surface layer of the mask from the external environment through breathing and the like are quickly inactivated by utilizing the quick antibacterial and antiviral characteristics of the modified guanidine salt or neomycin sulfate, so that the viruses or bacteria microorganisms are prevented from penetrating through the mask to enter the human body to cause harm. Meanwhile, the cross infection caused by hand touch is prevented, and the secondary pollution to the environment can be avoided. In addition, the degradability of the mask surface layer can effectively relieve the environmental pollution pressure caused by non-degradable petroleum-based fiber materials such as polypropylene and the like. High-efficiency and low-resistance polypropylene melt-blown non-woven fabric is adopted in the core layer, which can effectively intercept and adsorb PM2.5 particulate matters, bacteria, viruses and other microorganisms through the electrostatic adsorption effect and the like to form a second protective barrier. Polypropylene spun-bonded non-woven fabric or degradable natural cotton fabric with skin-friendly characteristic is adopted in the inner layer, so that the comfortableness and the fitting property in the actual mask wearing process are improved. The degradable surface layer and the degradable inner layer are adopted, so that the degradability of most mask materials is ensured, and the environmental pollution is further reduced. The key point of the present disclosure is the functionalized preparation of the surface layer.

(2) The present disclosure adopts modified guanidine salt and neomycin sulfate as the active factors of antibiosis and antivirus, the modified guanidine salt has stronger antibacterial and antiviral property, low cytotoxicity and high biocompatibility, and is widely applied to the fields such as medicine, packaging, food, agriculture. Neomycin sulfate is a water-soluble aminoglycoside antibiotic, exhibits potent antibacterial activity against both gram-positive and gram-negative bacterial strains, and has certain antiviral properties, which inhibits viral RNA replication and translation, thereby inactivating viruses. By covalently grafting the modified guanidine salt or neomycin sulfate on the surface of the cellulose spunlace non-woven fabric, the risk that the human body is injured due to leakage or migration of the antibacterial agent modified mask such as graphene and metal ions in the use process can be avoided, and the mask has high-efficiency and durable antibacterial and antiviral properties as well as dust-proof and anti-haze effects, and can effectively inactivate pathogenic microorganisms, so that propagation infection of coronavirus such as HCoV-229E, SARS-COV-2 can be effectively prevented.

(3) The modified guanidine salt and the neomycin sulfate adopted by the present disclosure have a wide antibacterial spectrum and a long-lasting antibacterial activity, and have the advantages such as high antibacterial efficiency, good water solubility, high-efficiency antiviral property. The modified guanidinium salts are effective in inactivating bacteria and viruses by disrupting cell membranes or capsids of the bacteria and viruses, thereby causing leakage of cytoplasm, or interfering with viral genomic content or structural unit, and causing complete virus breakdown. Neomycin sulfate adheres to the cell wall surface to inactivate enzymes on the cell surface, subsequently the cell wall is destroyed, and neomycin sulfate enters into the cell to be combined with DNA, so that the organism is inactivated to play a role in sterilization and virus resistance.

(4) The antibacterial and antiviral mask prepared by the present disclosure has the antiviral activity rate up to 98.21% against HCoV-229E, 99.84% against COVID-19 coronavirus SARS-COV-2, 99.99% against gram-negative *Escherichia coli* and gram-positive *Staphylococcus aureus* and the droplet contact angle is 120.9°.

DESCRIPTION OF EMBODIMENTS

In order to make the objects, technical solutions and advantages of the present disclosure more apparent, the present disclosure is further described in detail with reference to specific embodiments below. It should be understood that the specific embodiments described herein are merely illustrative of the disclosure and are not intended to limit the present disclosure. Unless otherwise indicated, reagents, methods and apparatus used in the present disclosure are conventional in the art.

In addition, it is also to be noted that the terms "comprise," "include" or any other variation thereof, are intended to cover a non-exclusive inclusion, such that a process, a method, a product, or an apparatus that comprises a list of elements does not include only those elements but may include other elements not expressly listed or inherent to such process, method, product, or apparatus.

Figure 1:
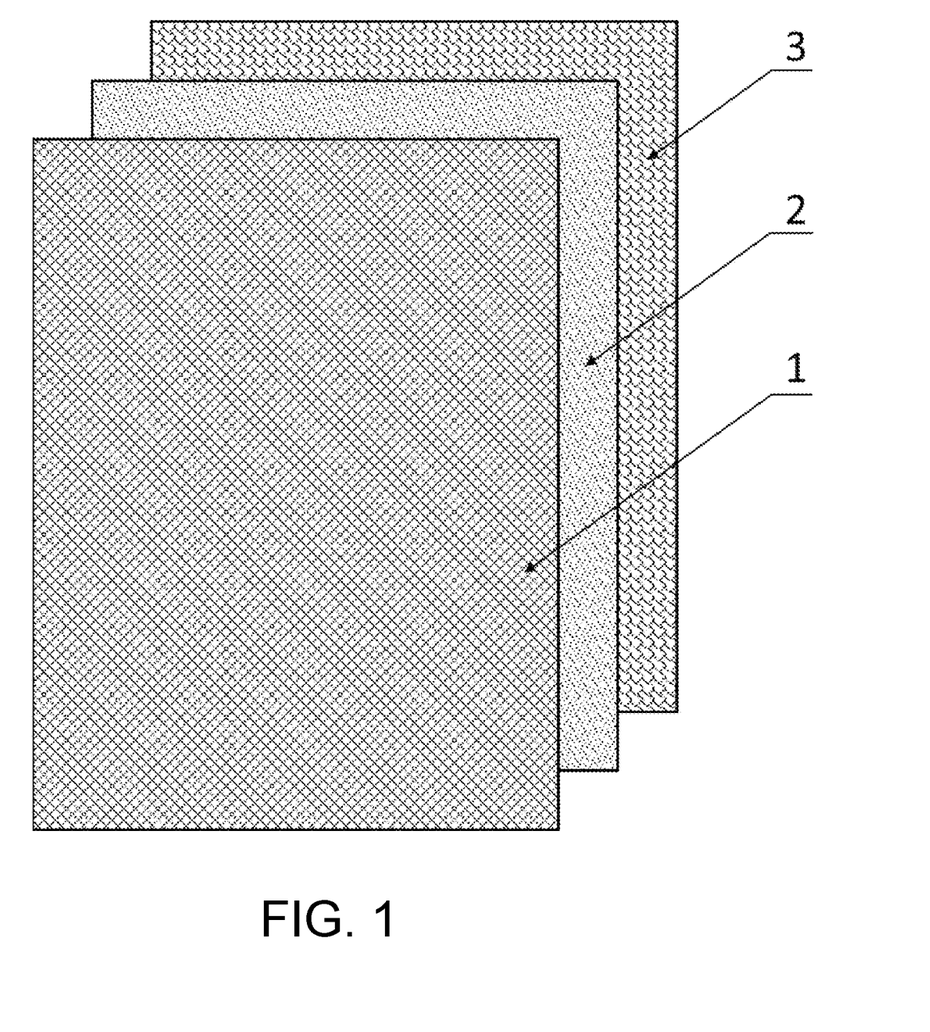
FIG. 1 illustrates a combination schematic view of functional layers of an antibacterial and antiviral mask according to the present disclosure.

Referring to FIG. 1, the present disclosure provides an antibacterial and antiviral mask, which includes a three-layer structure, namely a surface layer 1, a core layer 2 and an inner layer 3 contacting a face from outside to inside. The surface layer 1 is made of an antibacterial and antiviral cellulose spunlace non-woven fabric, the core layer 2 is made of a high-efficiency and low-resistance polypropylene melt-blown non-woven fabric, and the inner layer 3 is made of a water-repellent skin-friendly polypropylene spun-bonded non-woven fabric or a degradable natural cotton fabric.

The cellulose spunlace non-woven fabric in the surface layer 1 is a carding spunlace non-woven fabric or a wet-laid spunlace non-woven fabric (ZHEJIANG BAOREN HEZHONG TECHNOLOGY CO., LTD), and the surface density is 20 g/m$^2$ to 70 g/m$^2$.

The carding spunlace non-woven fabric in the surface layer (1) is prepared by sequentially willowing, lapping, carding, and hydroentanglement-reinforcing cellulose fibers and eventually drying in an oven, and the length of the cellulose fiber is 28 mm to 58 mm.

The wet-laid spunlace non-woven fabric in the surface layer (1) is prepared by uniformly mixing 60% to 80% of wood pulp fibers and 20% to 40% of cellulose fibers with each other through beating, followed by mixing, starching, wet-laid forming, hydroentanglement reinforcing, and eventually drying in an oven. The length of the wood pulp fibers ranges from 1 mm to 5 mm, and the length of the cellulose fibers ranges from 6 mm to 16 mm.

The preparation method of the antibacterial and antiviral cellulose spunlace non-woven fabric in the surface layer 1 includes the following steps.

In S1, cyclohexyl isocyanate and an organic solvent are mixed with each other, and a catalyst is added to prepare a reaction solution. The vacuum-dried cellulose spunlace non-woven fabric is immersed in the reaction solution, heated for a certain time to perform covalent grafting reaction, washed with ethanol and deionized water after the reaction is completed, and dried.

In S2, a polymer and a dioxane organic solvent are mixed with each other to prepare a reaction solution. The cellulose spunlace non-woven fabric obtained in Step S1 is immersed in the reaction solution for a certain time, the cellulose spunlace non-woven fabric obtained in Step S1 is washed with ethanol after the reaction is completed and dried. And the front and back sides of the non-woven fabric are cured for a certain time by ultraviolet light.

In S3, the modified guanidine salt or neomycin sulfate is dissolved in different solvents to prepare reaction solutions with different concentrations. The cellulose spunlace non-woven fabric obtained in Step S2 is immersed in the reaction solutions. The cellulose spunlace non-woven fabric are heated in different acid-base solutions for a certain time to perform covalent grafting reaction. The cellulose spunlace non-woven fabric is washed with ethanol and deionized water after the reaction is completed, and the cellulose spunlace non-woven fabric is dried to obtain the antibacterial and antiviral cellulose spunlace non-woven fabric.

Preferably, in Step S1, the heating reaction process is performed by reacting at a constant temperature of 60° C. to 120° C. for 0.5 hours to 24 hours.

Preferably, in Step S1, the organic solvent includes one or at least two combinations of N, N-dimethylformamide, acetonitrile, dioxane, 4-dimethylaminopyridine.

Preferably, in Step S1, the catalyst includes one or at least two combinations of triethylamine, dibutyltin dilaurate.

Preferably, in Step S2, the structure of the polymer is:

where m=1-5, n=10-80.

Preferably, in Step S2, the immersing time is 3 minutes to 10 minutes, and the ultraviolet light curing time is 3 minutes to 10 minutes for one side.

Preferably, in Step S3, the reaction process is reacting for 4 hours to 24 hours at a constant temperature of 60° C. to 100° C. under the conditions that the concentration of the reaction solution is 2 mg/mL to 200 mg/mL and the pH value ranges from 6 to 10.

Preferably, in Step S3, the reaction solvent includes one or at least two combinations of deionized water, ethanol, and dimethyl sulfoxide.

A high-efficiency low-resistance polypropylene melt-blown non-woven fabric in the core layer 2 (Xuancheng Guangneng non-wovens Co., Ltd.), is with a fiber fineness of 1 μm to 3 μm, and the surface density is 20 g/m² to 60 g/m²; an interception efficiency of NaCl particles with the size of 0.25 μm to 0.3 μm is ≥99% under the condition of an air flow rate of 85 L/min and a pressure drop of ≤95 Pa. An interception efficiency of NaCl particles with the size of 0.25 μm to 0.3 μm is ≥95% under the condition that the air flow rate is 32 L/min, and the pressure drop is ≤35 Pa.

A polypropylene spun-bonded non-woven fabric in the inner layer 3 (prepared by Donghua University) has the fiber fineness of 20 μm to 30 μm and the surface density of 20 g/m² to 45 g/m².

In the following detailed implementations, the antiviral property of the antibacterial and antiviral mask prepared is tested by a virus titer $TCID_{50}$ test according to ISO 18184: 2019 standard.

The present disclosure will be further described in detail through specific implementation examples and in conjunction with the accompanying drawings.

Example 1

Referring to FIG. 1, this example provides an antibacterial and antiviral mask, the mask includes a three-layers structure, including a surface layer 1, a core layer 2 and an inner layer 3 contacting a face from outside to inside, the surface layer 1 is made of antibacterial and antiviral cellulose wet-laid spunlace non-woven fabric, the core layer 2 is made of a high-efficiency and low-resistance polypropylene melt-blown non-woven fabric, and the inner layer 3 is made of a water-repellent skin-friendly polypropylene spunbonded non-woven fabric or a degradable natural cotton fabric.

The cellulose wet-laid spunlace non-woven fabric in the surface layer 1 is with a surface density of 60 g/m², which is prepared by uniformly mixing 75% of wood pulp fiber and 25% of cellulose fiber with each other through beating, followed by mixing, starching, wet-laid forming, hydroentanglement reinforcing, and eventually drying in an oven; the length of the wood pulp fibers ranges from 2 mm to 4 mm, and the length of the cellulose fiber ranges from 12 mm. The preparation method of the antibacterial and antiviral cellulose wet-laid spunlace non-woven fabric of the surface layer 1 includes the following steps.

In S1, 4 mL of cyclohexyl isocyanate and 20 mL of N,N-dimethylformamide are mixed with each other, 50 μL of dibutyltin dilaurate is added to prepare a reaction solution. The vacuum-dried cellulose wet-laid spunlace non-woven fabric is immersed into the reaction solution, reacted at a constant temperature of 100° C. for 1 hour to perform covalent grafting reaction, washed with ethanol and deionized water after the reaction is completed, and dried.

In S2, 210 mg of polymer and 30 mL of dioxane organic solvent are mixed with each other to prepare a reaction solution, the cellulose we-laid spunlace non-woven fabric obtained in Step S1 is immersed in the reaction solution for 5 minutes. The cellulose wet-laid spunlace non-woven fabric is washed with ethanol after the reaction is completed, and dried. And the non-woven fabric is cured by ultraviolet light for 5 minutes on both the front side and the back side.

In S3, the modified guanidine salt is dissolved in deionized water to prepare a reaction solution with a concentration of 200 mg/mL, the cellulose wet-laid spunlace non-woven fabric obtained in Step S2 is immersed in the reaction solution, reacted at a constant temperature of 80° C. in a solution with the pH of >7 for 24 hours to perform covalent grafting reaction. The cellulose wet-laid spunlace non-woven fabric is washed with ethanol and deionized water after the reaction is completed, and dried to obtain the antibacterial and antiviral cellulose wet-laid spunlace non-woven fabric.

Figure 2:
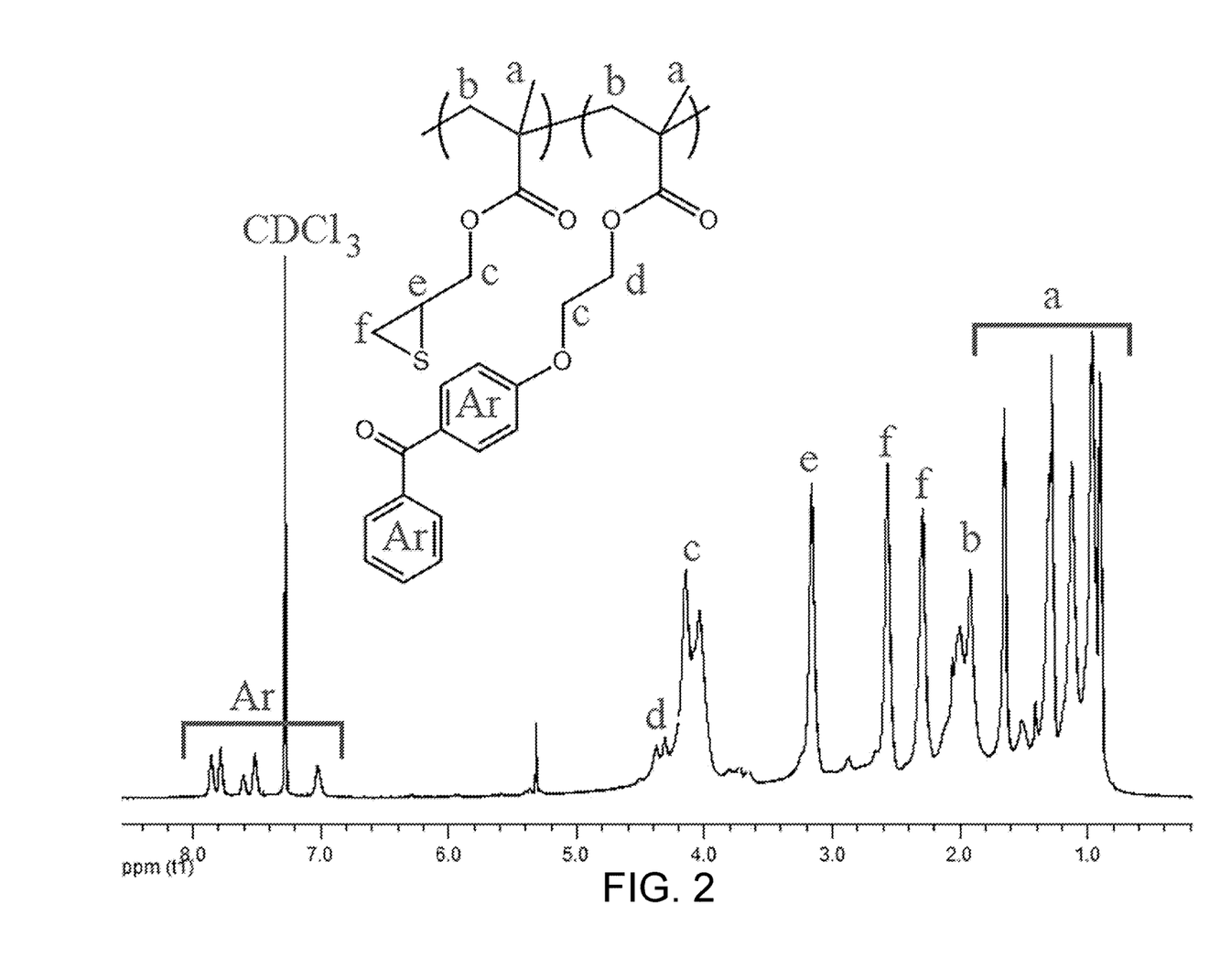
FIG. 2 illustrates a $^1$H-NMR spectrum of a polymer according to the present disclosure.

In Step S2, the structure of the polymer is:

where m=1 and n=14; the polymer is prepared by mixing monomer TMA and BPEMA with each other according to a molar ratio of 95:5 and polymerizing the mixture under the action of azobisisobutyronitrile as an initiator. And the preparation is specifically as follows: TMA and BPEMA are dissolved in dioxane and are placed into a round-bottom flask, meanwhile, azobisisobutyronitrile initiator is added, polymerization reaction is carried out for 8 hours under the nitrogen protection at the temperature of 80° C., the polymer is washed out with hexane after the reaction is completed, and dried. The tested $^1$H-NMR spectrum structure is as illustrated in FIG. 2.

Figure 3:
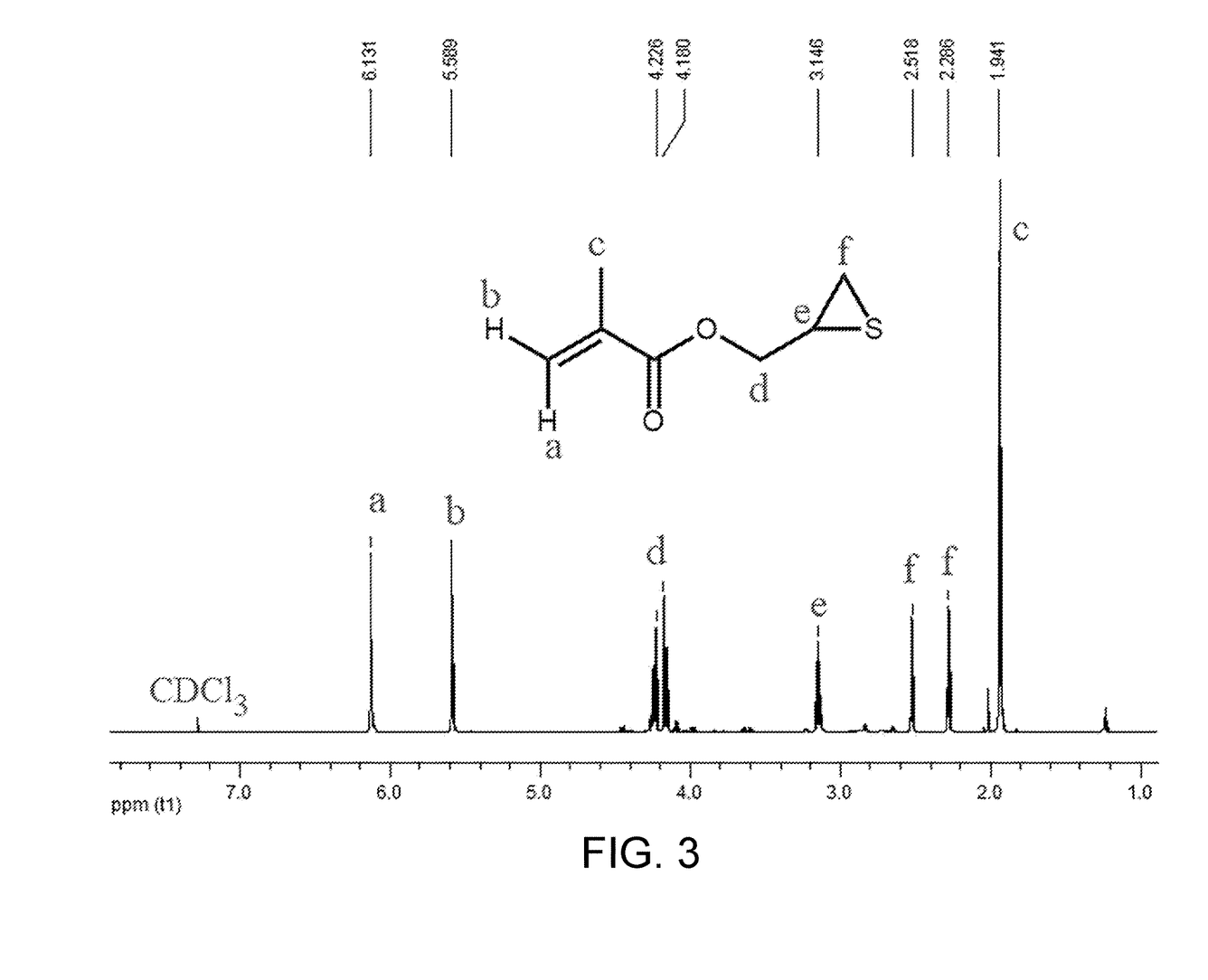
FIG. 3 illustrates a $^1$H-NMR spectrum of TMA according to the present disclosure.

The structure of the monomer TMA is as follows:

the preparation process includes the following steps. Thiourea and neutral alumina are mixed with each other in the molar ratio of 1:3, grinded uniformly. Glycidyl methacrylate is slowly added into the uniform mixture by half of the molar mass of thiourea, and further grinded. After standing for one hour, the monomer TMA is washed out with ethyl acetate, and the 1H-NMR spectrum structure is tested as illustrated in FIG. 3.

Figure 4:
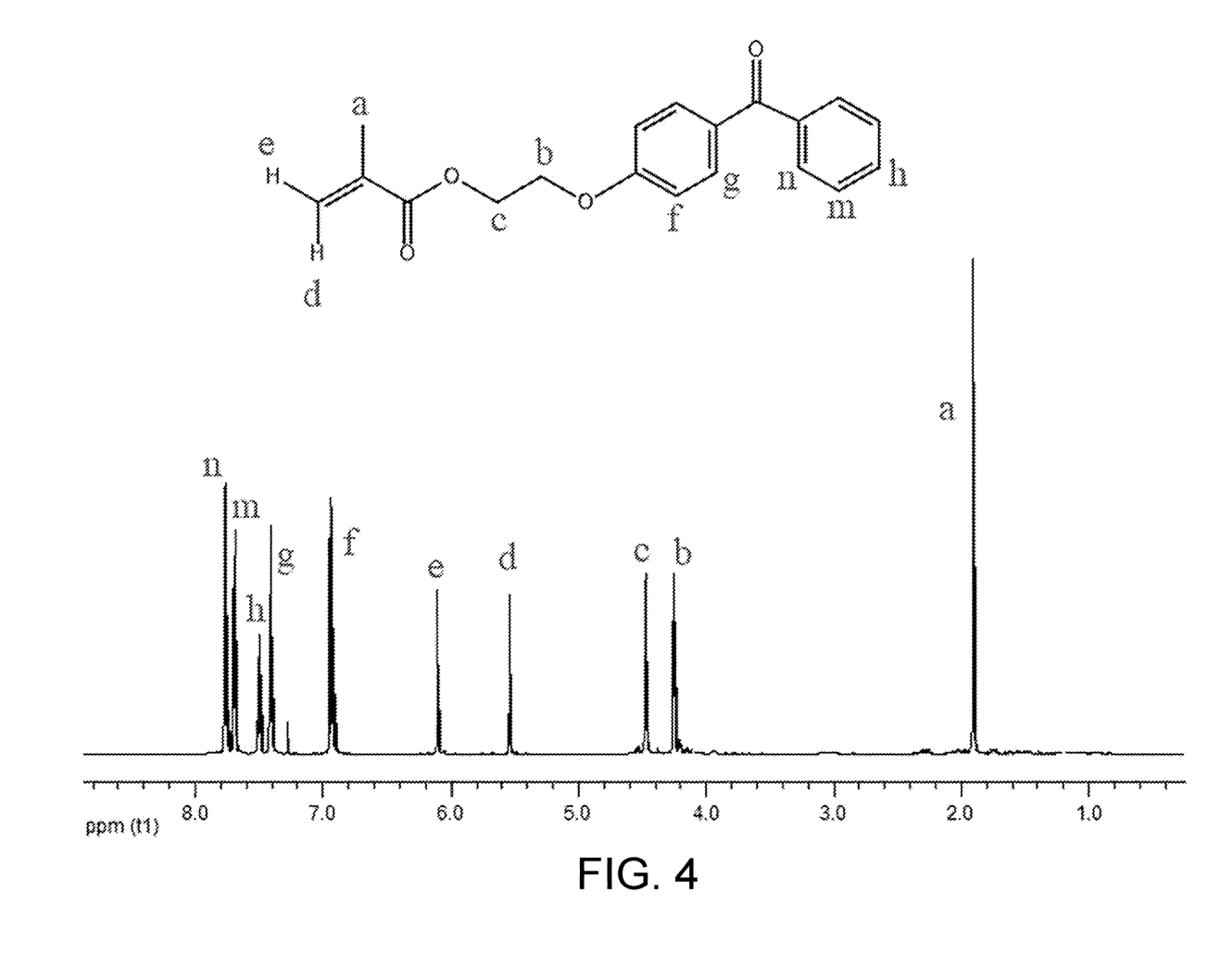
FIG. 4 illustrates a $^1$H-NMR spectrum of BPEMA according to the present disclosure.

The structure of the monomer BPEMA is as follows:

the preparation process includes the following steps.
  i) 4-hydroxybenzophenone and ethylene carbonate (molar ratio 1:1), toluene and sodium iodide are mixed, heated at 100° C. to obtain a clear solution, and then the temperature is raised to 180° C. to react for 2 hours. Eventually, the reaction is cooled, 100 mL of toluene and 25 mL of water are added to extract the organic phase product, the organic phase is further washed twice with water and dried with MgSO$_4$ and the solvent is removed to obtain 4-(2-hydroxyethoxy)benzophenone.
  ii) The obtained 4-(2-hydroxyethoxy)benzophenone and triethylamine (the molar ratio of 2:3) are dissolved in dichloromethane and the reaction mixture is cooled in an ice bath under the nitrogen atmosphere. Then, methacryloyl chloride dissolved in methylene chloride is added dropwise to the above reaction mixture, the reaction is continued at room temperature overnight, and then transferred to a separatory funnel, washed with cold water, an aqueous solution of sodium hydrogencarbonate, and water, dried with MgSO$_4$ and filtered to remove the solvent to obtain monomeric BPEMA, the tested $^1$H-NMR spectrum is as illustrated in FIG. 4.

A high-efficiency low-resistance polypropylene melt-blown non-woven fabric in the core layer 2 is with a fiber fineness of 2.5 μm and a surface density of 40 g/m$^2$. A polypropylene spun-bonded non-woven fabric in the inner layer 3 is with the fiber fineness of 24 μm, and the surface density is 25 g/m$^2$.

The antibacterial and antiviral mask prepared in Example 1 has an antiviral activity rate up to 95.96% against coronavirus HCoV-229E, 99.72% against COVID-19 coronavirus SARS-CoV-2, 99.99% against *Escherichia coli* and *Staphylococcus aureus*, and a droplet contact angle of 118.7°.

Example 2

This example provides an antibacterial and antiviral mask, which is different from that of Example 1 in that: in Step S3, the modified guanidine salt is dissolved in deionized water to prepare a reaction solution with a concentration of 100 mg/mL, and the rest is the same as in Example 1.

Example 3

This example provides an antibacterial and antiviral mask, which is different from that of Example 1 in that: in Step S3, the modified guanidine salt is dissolved in deionized water to prepare a reaction solution having a concentration of 25 mg/mL, and the rest is the same as in Example 1.

Example 4

This example provides an antibacterial and antiviral mask, which is different from that of Example 1 in that: in Step S3, the modified guanidine salt is dissolved in deionized water to prepare a reaction solution with a concentration of 5 mg/mL, and the rest is the same as in Example 1.

Example 5

This example provides an antibacterial and antiviral mask, which is different from that of Example 1 in that: the preparation method of the antibacterial and antiviral cellulose wet-laid spunlace non-woven fabric in the surface layer 1 includes the following steps.

In S1, 4 mL of cyclohexyl isocyanate and 20 mL of N, N-dimethylformamide are mixed with each other, 50 μL of dibutyltin dilaurate is added to prepare a reaction solution. The vacuum-dried cellulose wet-laid spunlace non-woven fabric is immersed into the reaction solution, reacted at constant temperature of 100° C. for 1 hour for covalent grafting reaction, washed with ethanol and deionized water after the reaction is completed, and dried.

In S2, 210 mg of polymer and 30 mL of dioxane organic solvent are mixed with each other to prepare a reaction solution, the cellulose wet-laid spunlace non-woven fabric obtained in Step S1 is immersed in the reaction solution for 5 minutes, the cellulose wet-laid spunlace non-woven fabric is washed with ethanol after the reaction is completed and dried. And the non-woven fabric is cured by ultraviolet light, for 5 minutes on both the front side and the back side.

In S3, neomycin sulfate is dissolved in deionized water to prepare a reaction solution with the concentration of 200 mg/mL. The cellulose wet-laid spunlace non-woven fabric obtained in Step S2 is immersed in the reaction solution, reacted at a constant temperature of 80° C. in a solution with the pH value of pH>7 for 24 hours to perform covalent grafting reaction, washed with ethanol and deionized water after the reaction is completed, and dried to obtain the antibacterial and antiviral cellulose wet-laid spunlace non-woven fabric.

The rest is the same as in Example 1.

The antibacterial and antiviral mask prepared by this example has the antiviral activity rate up to 97.85% against HCoV-229E, 99.29% against SARS-COV-2, 99.99% against *Escherichia coli* and *Staphylococcus aureus*, and a droplet contact angle of 119.6°.

Example 6

This example provides an antibacterial and antiviral mask, which is different from that of Example 5 in that: in Step S3, neomycin sulfate is dissolved in deionized water to prepare a reaction solution having a concentration of 100 mg/mL, and the rest is the same as in Example 5.

Example 7

This example provides an antibacterial and antiviral mask, which is different from that of Example 5 in that: in Step S3, neomycin sulfate is dissolved in deionized water to prepare a reaction solution having a concentration of 25 mg/mL, and the rest is the same as in Example 5.

Example 8

This example provides an antibacterial and antiviral mask, which is different from that of Example 5 in that: in Step S3, neomycin sulfate is dissolved in deionized water to prepare a reaction solution having a concentration of 5 mg/mL, and the rest is the same as in Example 5.

Comparative Example 1

This example provides an antibacterial and antiviral mask, which is different from that of Example 1 in that: the preparation method of the antibacterial and antiviral cellulose wet-laid spunlace non-woven fabric in the surface layer 1 includes the following steps.

In S1, 210 mg of polymer and 30 mL of dioxane organic solvent are mixed with each other to prepare a reaction solution, the cellulose wet-laid spunlace non-woven fabric is immersed in the reaction solution for 5 minutes, the non-woven fabric is washed by ethanol after the reaction is completed, and dried, and the non-woven fabric is cured by ultraviolet light, for 5 minutes on both the front side and the back side.

In S2, the modified guanidine salt is dissolved in deionized water to prepare a reaction solution with the concentration of 200 mg/mL, the cellulose wet-laid spunlace non-woven fabric obtained in Step S1 is immersed in the reaction solution, reacted at a constant temperature of 80° C. in a solution with the pH value of pH>7 for 24 hours to perform covalent grafting reaction, washed with ethanol and deionized water after the reaction is completed, and dried to obtain the antibacterial and antiviral cellulose wet-laid spunlace non-woven fabric.

The rest is the same as in Example 1.

The antibacterial and antiviral mask prepared by this comparative example has the antiviral activity rate up to 96.03% against HCoV-229E, 99.84% against SARS-COV-2, 99.99% against *Escherichia coli* and *Staphylococcus aureus* and a droplet contact angle is 65.4°.

Comparative Example 2

This example provides an antibacterial and antiviral mask, which is different from that of Example 5 in that: the preparation method of the antibacterial and antiviral cellulose wet-laid spunlace non-woven fabric in the surface layer 1 includes the following steps.

In S1, 210 mg of polymer and 30 mL of dioxane organic solvent are mixed with each other to prepare a reaction solution, the cellulose wet-laid spunlace non-woven fabric is immersed in the reaction solution for 5 minutes, the non-woven fabric is washed by ethanol after the reaction is completed, and dried, and the non-woven fabric is cured by ultraviolet light, for 5 minutes on both the front side and the back side.

In S2, neomycin sulfate is dissolved in deionized water to prepare a reaction solution with the concentration of 200 mg/mL, the cellulose wet-laid spunlace non-woven fabric obtained in Step S1 is immersed in the reaction solution, reacted at a constant temperature of 80° C. in a solution with the pH value of pH>7 for 24 hours to perform covalent grafting reaction, washed with ethanol and deionized water after the reaction is completed, and dried to obtain the antibacterial and antiviral cellulose wet-laid spunlace non-woven fabric.

The rest is the same as in Example 5.

The antibacterial and antiviral mask prepared by this comparative example has the antiviral activity rate up to 98.21% against HCoV-229E, 99.35% against SARS-COV-2, 99.99% against *Escherichia coli* and *Staphylococcus aureus* and a droplet contact angle is 57.5°.

The masks made of the antibacterial and antiviral cellulose wet-laid spunlace non-woven fabric provided in the above examples and comparative examples are tested for antibacterial and antiviral properties and filtration efficiency, and the results are as shown in Table 1.

TABLE 1

|  | Test item | | | | | |
| --- | --- | --- | --- | --- | --- | --- |
|  | Antibacterial property testing Antibacterial rate (%) | | Antivirus property testing Antiviral activity (%) | | Filtering efficiency test Filtering efficiency (%) | Hydrophilicity test Contact angle (°) |
|  | Object | | | | | |
|  | *Escherichia coli* | *Staphylococcus aureus* | Coronavirus HCoV-229E | COVID-19 SARS-CoV-2 | Sodium chloride aerosol | Water droplet |
| Example 1 | 99.99 | 99.99 | 95.96 | 99.72 | 99 | 118.7 |
| Example 2 | 99.99 | 99.99 | 95.78 | 99.13 | 99 | 119.9 |
| Example 3 | 99.92 | 99.83 | 94.26 | 99.09 | 99 | 119.1 |
| Example 4 | 99.04 | 98.79 | 93.12 | 98.25 | 99 | 120.9 |

TABLE 1-continued

| | Antibacterial property testing Antibacterial rate (%) | | Antivirus property testing Antiviral activity (%) | | Filtering efficiency test Filtering efficiency (%) | Hydrophilicity test Contact angle (°) |
|---|---|---|---|---|---|---|
| | | | Object | | | |
| | Escherichia coli | Staphylococcus aureus | Coronavirus HCoV-229E | COVID-19 SARS-CoV-2 | Sodium chloride aerosol | Water droplet |
| Example 5 | 99.99 | 99.99 | 97.85 | 99.29 | 99 | 119.6 |
| Example 6 | 99.99 | 99.99 | 97.54 | 99.11 | 99 | 119.7 |
| Example 7 | 99.12 | 99.72 | 97.19 | 98.95 | 99 | 120.1 |
| Example 8 | 98.68 | 99.01 | 95.32 | 98.02 | 99 | 121.2 |
| Comparative example 1 | 99.99 | 99.99 | 96.03 | 99.84 | 99 | 65.4 |
| Comparative example 2 | 99.99 | 99.99 | 98.21 | 99.35 | 99 | 57.5 |

As can be seen from Table 1, the mask prepared by the present disclosure has excellent antibacterial and antiviral properties, the antibacterial rate against *Escherichia coli* and *Staphylococcus aureus* is up to 99.99%, the antiviral activity against HCoV-229E is up to 98.21%, the antiviral activity against SARS-COV-2 is up to 99.35%, and the antibacterial and antiviral activity against $PM_{2.5}$ in the air is up to 99.99%.

As can be seen by comparing Examples 1 to 4 with Examples 5 to 8, the examples adopt the antibacterial and antiviral mask of the present disclosure, and the antibacterial and antiviral effects increase as the increase of the grafting reaction concentration of the modified guanidinium salt or neomycin sulfate.

It can be seen from comparison between Example 1 (Example 5) and Comparative Example 1 (Comparative Example 2) that although the antibacterial and antiviral mask without hydrophobic modification has a better antiviral effect, the contact angle is smaller and the self-cleaning property is poorer, which indicates that the antibacterial and antiviral cellulose wet-laid spunlace non-woven fabric with hydrophobic modification is suitable for being used as a surface layer material of the mask, and the non-woven fabric without hydrophobic modification can be used as an inner layer material of the mask, so that the prepared mask has excellent antibacterial and antiviral properties and filtering efficiency.

The above are only illustrative embodiments of the present disclosure and are not limitations on any form or substance of the present disclosure. It should be pointed out that for ordinary technical personnel in this art, without departing from the methods of the present disclosure, a plurality of improvements and supplements made should also be considered as the protection scope of the present disclosure; equivalent alterations such as minor changes, modifications, and evolution made by the technical personnel familiar with this art by using the above disclosed technical contents without departing from the spirit and scope of the present disclosure are all equivalent embodiments of the present disclosure; meanwhile, all changes, modifications and evolutions of the equivalent alterations made to the above embodiments according to the substantive technology of the present disclosure are still within the protection scope of the present disclosure.

What is claimed is:

1. A method for preparing an antibacterial and antiviral degradable mask, wherein the antibacterial and antiviral degradable mask comprises a three layered structure, including a surface layer (1), a core layer (2) and an inner layer (3) that contacts a face from outside to inside; the surface layer (1) is made of an antibacterial and antiviral cellulose spunlace non-woven fabric; the core layer (2) is made of a polypropylene melt-blown non-woven fabric; the inner layer (3) is made of a polypropylene spunbond non-woven fabric or a degradable natural cotton fabric; the polypropylene melt-blown non-woven fabric in the core layer (2) possesses with a fiber fineness of 1 μm to 3 μm and a surface density of 20 g/m² to 60 g/m²; the polypropylene spunbond non-woven fabric in the inner layer (3) possesses a fiber fineness of 20 μm to 30 μm and a surface density of 20 g/m² to 45 g/m² and the degradable natural cotton fabric possesses a surface density of 20 g/m² to 45 g/m²; a preparation of the antibacterial and antiviral cellulose spunlace non-woven fabric of surface layer (1) includes following steps S1, mixing cyclohexyl isocyanate and organic solvent with each other in a mass ratio of 1:(5-10), and adding a homogeneous catalyst to prepare a first reaction solution; wherein the homogeneous catalyst is 4-dimethylaminopyridine, triethylamine, or dibutyltin dilaurate; immersing the cellulose spunlace non-woven fabric in the first reaction solution and heating for 0.5 hours to 24 hours for a first covalent grafting reaction, washing the cellulose spunlace non-woven fabric with ethanol and deionized water after the first covalent grafting reaction is completed, followed by drying the cellulose spunlace non-woven fabric; S2, mixing a polymer and dioxane organic solvent with each other in a mass ratio of 1:7 to prepare a second reaction solution; immersing the cellulose spunlace non-woven fabric obtained in Step S1 in the second reaction solution for 3 minutes to 10 minutes for a second reaction; washing the cellulose spunlace non-woven fabric obtained in Step S1 with ethanol after the second reaction is completed, followed by drying the cellulose spunlace non-woven fabric; then, curing front and back sides of the cellulose spunlace non-woven fabric under ultraviolet light including irradiating one side for 3 minutes to 10 minutes; S3, dissolving modified guanidine salt or neomycin sulfate in a solvent to prepare a third reaction solution with a concentration ranging from 0.01 mg/mL to 200 mg/mL and a pH value of pH>7; immersing the cellulose spunlace non-woven fabric obtained in Step S2 in the third reaction solution held at a constant temperature of 60° C. to 100° C. for 4 hours to 24 hours to achieve a second covalent grafting reaction; washing the cellulose spunlace non-woven fabric with ethanol and deionized water after the second covalent grafting reaction is completed, followed by drying the cellulose spunlace non-woven fabric to obtain the antibacterial and antiviral cellulose spunlace non-woven fabric;

in Step S2, a structure of the polymer is where m=1-5, n=10-80; the polymer is synthesized by mixing and dissolving monomers TMA an BPEMA at molar ratio of 95:5 in a dioxane and placing a solution thereof into a circular bottom flask; at the same time adding an azobisisobutyronitrile initiator thereto to form a second solution and performing a polymerizing reaction of the second solution for 8 hours under a nitrogen protection at 80° C.; and washing out the polymer with hexane after the polymerizing reaction is completed then drying the polymer, wherein structural formulas of the monomers TMA and BPEMA is as follows:

TMA:

BPEMA:

2. The method for preparing the antibacterial and antiviral degradable mask according to claim 1, wherein in Step S1, the heating is carried out at a constant temperature of 60° C. to 120° C. for 0.5 hours to 24 hours; the organic solvent includes at least one of N, N-dimethylformamide, acetonitrile, dioxane, and 4-dimethylaminopyridine.

3. The method for preparing the antibacterial and antiviral degradable mask according to claim 1, wherein the solvent in the third reaction solution of step S3 comprises at least one of deionized water, ethanol, and dimethyl sulfoxide.

4. The method for preparing the antibacterial and antiviral degradable mask according to claim 1, wherein the cellulose spunlace non-woven fabric in the surface layer (1) is a carded spunlace non-woven fabric or a wet-laid spunlace non-woven fabric, and a surface density of the carded spunlace non-woven fabric or the wet-laid spunlace non-woven fabric is 20 g/m² to 70 g/m².

5. The method for preparing the antibacterial and antiviral degradable mask according to claim 4, wherein the carded spunlace non-woven fabric in the surface layer (1) is prepared by sequentially willowing, lapping, carding, and hydroentanglement-reinforcing cellulose fibers and subsequently drying in an oven.

6. The method for preparing the antibacterial and antiviral degradable mask according to claim 5, wherein a length of the cellulose fiber ranges from 28 mm to 58 mm.

7. The method for preparing the antibacterial and antiviral degradable mask according to claim 4, wherein the wet-laid spunlace non-woven fabric in the surface layer (1) is prepared by uniformly mixing 60% to 80% of wood pulp fibers and 20% to 40% of cellulose fibers with each other through beating, followed by mixing, starching, wet-laid forming, hydroentanglement reinforcing, and subsequently drying in an oven.

8. The method for preparing the antibacterial and antiviral degradable mask according to claim 7, wherein a length of the wood pulp fibers ranges from 1 mm to 5 mm, and a length of the cellulose fiber ranges from 6 mm to 16 mm.

* * * * *

UNITED STATES PATENT AND TRADEMARK OFFICE
CERTIFICATE OF CORRECTION

PATENT NO. : 12,193,532 B2  
APPLICATION NO. : 18/561291  
DATED : January 14, 2025  
INVENTOR(S) : Chao Deng et al.

Page 1 of 1

It is certified that error appears in the above-identified patent and that said Letters Patent is hereby corrected as shown below:

On the Title Page

Item (71) Applicant should read: NANJING FORESTRY UNIVERSITY, Jiangsu (CN)

Item (72) Inventors should read: Chao DENG, Jiangsu (CN), Farzad SEIDI, Jiangsu (CN), Qiang YONG, Jiangsu (CN), Xiangyu JIN, Jiangsu (CN), Chengcheng LI, Jiangsu (CN), Haiying WEI, Jiangsu (CN)

Signed and Sealed this  
Eleventh Day of March, 2025

Coke Morgan Stewart  
*Acting Director of the United States Patent and Trademark Office*